United States Patent
Robertson

(10) Patent No.: US 6,250,699 B1
(45) Date of Patent: Jun. 26, 2001

(54) GAME DRAGGING DEVICE

(76) Inventor: Ronald I. Robertson, 26 Cedar Grove Rd., Petal, MS (US) 39465

( * ) Notice: Subject to any disclaimer, the term of this patent is extended or adjusted under 35 U.S.C. 154(b) by 0 days.

(21) Appl. No.: 09/577,114

(22) Filed: May 23, 2000

(51) Int. Cl.$^7$ ............................. A01M 31/00; B65G 7/12
(52) U.S. Cl. ........................... 294/153; 294/26; 294/152
(58) Field of Search ................................. 294/15, 26, 149, 294/150, 152, 153, 156, 165; 119/792, 801, 802; 224/103, 184, 921; 280/19; 452/185, 187, 189, 192

(56) References Cited

U.S. PATENT DOCUMENTS

| | | | |
|---|---|---|---|
| 2,931,629 | * | 4/1960 | Keller ................................. 294/149 X |
| 3,038,644 | * | 6/1962 | Johnson ................................. 224/184 |
| 4,015,762 | | 4/1977 | Mendillo . |
| 4,023,844 | * | 5/1977 | Roberts ................................. 294/26 |
| 4,529,240 | * | 7/1985 | Engel ................................. 294/150 X |
| 5,029,921 | | 7/1991 | Houghton et al. . |
| 5,316,356 | | 5/1994 | Nutting . |
| 5,351,365 | | 10/1994 | Hauck . |
| 5,382,064 | | 1/1995 | Blais . |
| 5,848,816 | | 12/1998 | Hancock . |
| 6,089,636 | * | 7/2000 | Harris ................................. 294/150 |
| 6,129,399 | * | 10/2000 | Burch ................................. 294/153 |

FOREIGN PATENT DOCUMENTS 3431400    2/1986    (DE) .

* cited by examiner

*Primary Examiner*—Johnny D. Cherry
(74) *Attorney, Agent, or Firm*—Stephen R. Greiner

(57) ABSTRACT

A game dragging device including a tether having an upper end bifurcated into two branches. Each of a pair of handles is respectively secured to one of the branches. A first fastener is secured to one of the branches and a second fastener is secured to the other of the branches. The second fastener is adapted to mate with, and releasably adhere to, the first fastener so that the handles can be selectively secured together in a side-by-side manner. A hook is secured to the lower end of the tether.

3 Claims, 1 Drawing Sheet

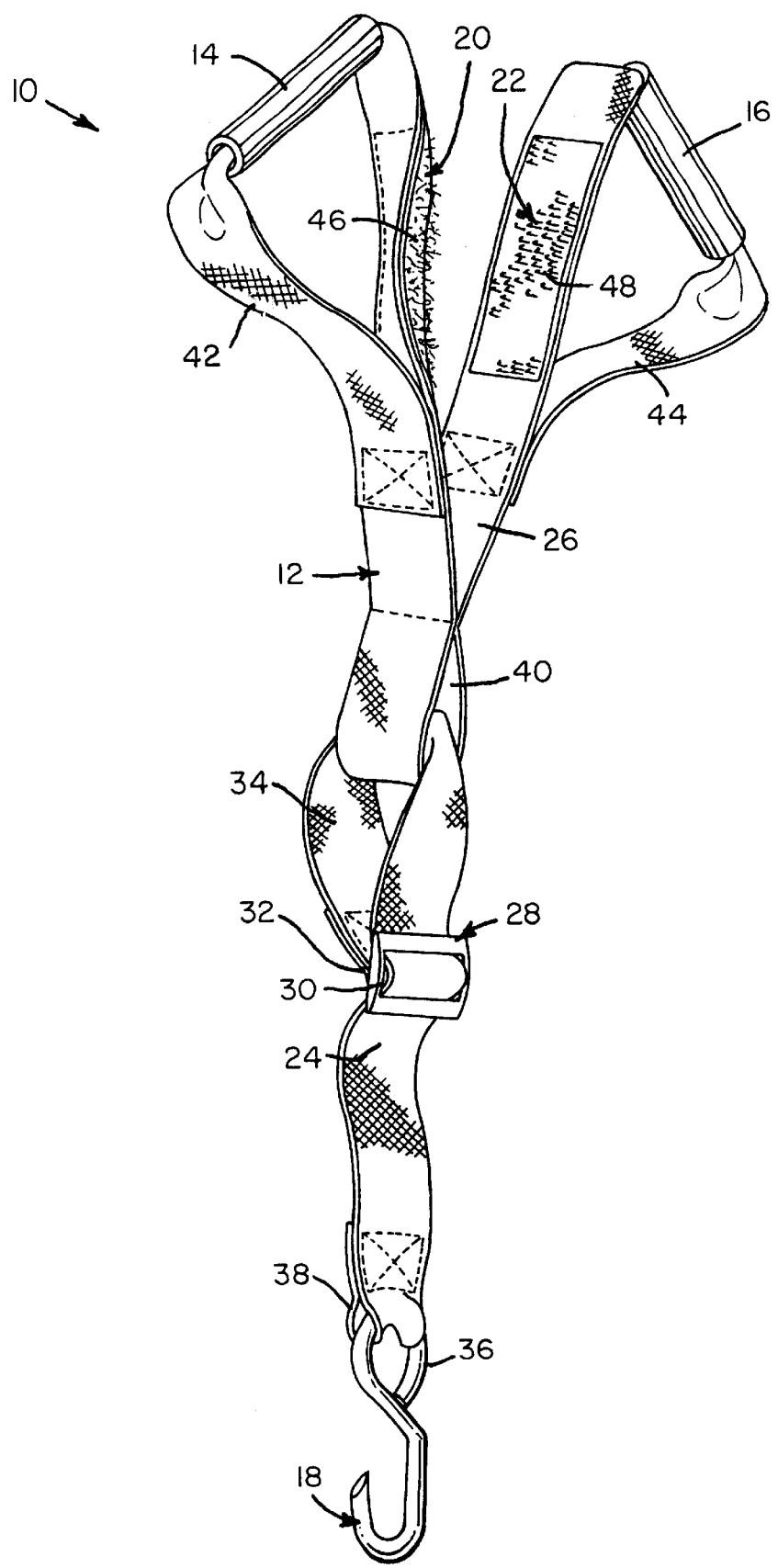

GAME DRAGGING DEVICE

FIELD OF THE INVENTION

The present invention relates generally to hand and hoist-line implements and, in particular, to hand-hook type devices.

BACKGROUND OF THE INVENTION

It has always been difficult for hunters to transport harvested game animals from forested areas to locations where the animals can be more easily processed for consumption or mounting as a trophy. The equipment that hunters carry like rifles, bows, quivers and tree stands often leave the hands of a hunter full. Thus, after dropping off equipment in a secure location, a trip back into the forest to retrieve an animal carcass is sometimes required with much wasted time, a significant problem if a hunting session is of limited duration.

Many products have been proposed to assist a hunter in moving an animal carcass. The simplest of these products utilize ropes tied around the neck or legs of the animal. Unfortunately, they are not very effective since they do not orient a carcass in a manner where it will easily pass between trees or over rocks. Shoulder harnesses, on the other hand, do elevate an animal carcass above the ground but require a greater expenditure of energy from a hunter—one that he may not be able to provide since such harnesses also tend to prevent one from obtaining a full breath of air. Of course, game-carrying carts have been available for years but are usually too large to maneuver through dense brush or over steeply sloping terrain.

SUMMARY OF THE INVENTION

In light of the problems associated with the devices for transporting harvested game animals, it is a principal object of the invention to provide a game dragging device that allows a hunter to pull the carcass of a game animal from a hard-to-reach area with great ease. The device automatically positions the carcass in the optimal position for transport, i.e., with the head up, legs folded back, and the weight of the body on the ground minimizing friction and reducing hang-ups on obstacles. The device may be used with all types of game such as: deer, antelope, and hogs.

It is another object of the invention to provide a device of the type described that is small in size, compact enough to fit in the pocket of a jacket, for example, when not in use. Although carried by one hunter, the device may be readily employed by a pair of hunters in tandem to move a single animal carcass. Thus, the work in moving an animal carcass can be shared to reduce fatigue.

It is an object of the invention to provide improved elements and arrangements thereof in a device for the purposes described which is lightweight in construction, inexpensive to manufacture, and dependable in use.

Briefly, the game dragging device in accordance with this invention achieves the intended objects by featuring a tether having an upper end bifurcated into two branches. Each of a pair of handles is respectively secured to one of the branches. A loop-type fastener is secured to one of the branches and a hook-type fastener is secured to the other of the branches. The hook-type fastener is adapted to mate with, and releasably adhere to, the loop-type fastener so that the handles can be selectively secured together in a side-by-side manner. A sharpened hook is secured to the lower end of the tether for attachment to the carcass of a game animal.

The foregoing and other objects, features and advantages of the present invention will become readily apparent upon further review of the following detailed description of the preferred embodiment as illustrated in the accompanying drawing.

BRIEF DESCRIPTION OF THE DRAWING

The present invention may be more readily described with reference to the accompanying drawing that is a perspective view of a game dragging device in accordance with the present invention.

DETAILED DESCRIPTION OF THE PREFERRED EMBODIMENT

Referring now to the drawing, a game dragging device in accordance with the present invention is shown at 10. Device 10 includes a tether 12 having a pair of handles 14 and 16 secured to its upper end and a sharpened hook 18 secured to its lower end. Hook and loop fasteners 20 and 22 on tether 12 adjacent its upper end permit handles 14 and 16 to be selectively attached together.

Tether 12 has a pair of straps 24 and 26 that are looped together to form something of a short chain. Straps 24 and 26 are each formed of woven, nylon webbing, a material known for its great tensile strength and durability. Straps 24 and 26 may be formed in any convenient length, but the preferred length for tether 12 when fully extended is about 30 inches (76 cm).

The top end of strap 24 retains a slide fastener 28 whereas the bottom end thereof retains hook 18. Preferably, the top end of strap 24 is wrapped around the central crossbar 30 of fastener 28, folded back upon itself and stitched in place thereby forming a loop 32 retaining crossbar 30. The bottom end of strap 24 is fed back through the fastener 28 and around crossbar 30 so as to form a loop 34 of adjustable size. The bottom end of strap 24, in turn, is extended through the integral ring 36 provided at the top of hook 18, folded back upon itself and stitched in place to form a hook-retaining loop 38.

Strap 26 is run through loop 34 in strap 24, folded back upon itself at its midpoint and stitched in place so as to form a loop 40 linked with loop 34. The opposite ends of strap 26 are extended respectively through handles or rigid plastic cylinders 14 and 16, folded back upon themselves and stitched in place to form handle-retaining loops 42 and 44. Pulling forces applied to either or both of handles 14 and 16 are transmitted through straps 24 and 26 to hook 18.

Hook and loop fasteners 20 and 22 sewn onto opposite ends of strap 26 permit handles 14 and 16 to be secured side-by-side. Fastener 20 comprises a strip of "Velcro" pile material including a dense mat of small, uncut loops 46 formed of thread. Fastener 22, however, comprises a strip of "Velcro" hook material having a plurality of transverse lines of hooks 48 spaced along its length. The ends of hooks 48 are turned inwardly so as to catch in loops 46 of fastener 20 when fasteners 20 and 22 are pressed together.

The use of game dragging device 10 is straightforward. First, hook 18 is extended through the cartilage separating the nostrils of a game animal's carcass. (With game having large antlers, strap 24 may be wrapped one or more times about the base of the antlers and hook 18 then latched onto loop 34.) Next, the hunter grasps both handles 14 and 16 secured together in a side-by-side relationship by firmly pressed together fasteners 20 and 22 for easy handling and pulls the animal to a desired location. With the animal carcass being oriented in the optimal position by device 10 with its head up and the weight of the body on the ground with the legs folded back, the carcass is easy to move.

Should two hunters be available to move the carcass, each may grasp and pull upon one of the handles 14 and 16. Handles 14 and 16 are, of course, separated from one another by grasping the opposite ends of strap 26 and pulling outwardly. This will cause hooks 48 and loops 46 to disengage. The transverse line of disengagement will progress lengthwise of the interlocked fasteners 20 and 22 so that they will separate smoothly.

After use, device 10 may be washed and, then, stored or transported in a folded, relatively compact, ready-to-use condition. For many hunters, the difficulties in moving a harvested game animal from wooded areas and back home will be a thing of the past. Perhaps some, put off by the physical exertion required to hunt larger game, will take up the sport in an active way because of the benefits offered by device 10.

While the invention has been described with a high degree of particularity, it will be appreciated by those skilled in the art that modifications may be made thereto. For example, straps 24 and 26 may be formed as an integral unit from a single piece of nylon webbing further simplifying the device if desired. Therefore, it is to be understood that the present invention is not limited to the sole embodiment described above, but encompasses any and all embodiments within the scope of the following claims.

I claim:

1. A game dragging device, comprising:
   a tether having an upper end bifurcated into two branches and a lower end;
   a pair of handles each being respectively secured to one of said branches;
   a first fastener secured to one of said branches;
   a second fastener secured to the other of said branches, said second fastener being adapted to mate with, and releasably adhere to, said first fastener; and,
   a hook secured to said lower end of said tether.

2. A game dragging device, comprising:
   a tether formed of flexible webbing having an upper end bifurcated into two branches and a lower end;
   a pair of handles each being respectively secured to one of said branches;
   a first fastener secured to one of said branches, said first fastener having a dense mat of small uncut loops;
   a second fastener secured to the other of said branches, said second fastener being adapted to mate with, and releasably adhere to, said first fastener, said second fastener having a plurality of hooks releasably fastenable with said loops of said first fastener; and,
   a hook secured to said lower end of said tether.

3. A game dragging device, comprising:
   a tether including:
      a first strap having a top end and a bottom end, said top end of said first strap having a slide fastener and said bottom end of said first strap being fed back through said fastener so as to form a first loop of adjustable size; and,
      a second strap being extended through said first loop in said first strap and being folded back upon itself at its midpoint and secured in place so as to form a second loop linked with said first loop, said second strap forming two branches extending away from said second loop;
   a pair of handles each being respectively secured to one of said branches of said second strap;
   a first fastener secured to one of said branches of said second strap adjacent said handle secured thereto, said first fastener having a dense mat of small uncut loops;
   a second fastener secured to the other of said branches of said second strap adjacent said handle secured thereto, said second fastener being adapted to mate with, and releasably adhere to, said first fastener, said second fastener having a plurality of hooks releasably fastenable with said loops of said first fastener; and,
   a hook secured to said bottom end of said first strap.

* * * * *